Feb. 12, 1963 H. G. ALEXANDER 3,077,278
TRUCK LOADING ASSEMBLY WITH DETACHABLE CONTAINER
Filed Dec. 16, 1960 3 Sheets-Sheet 1
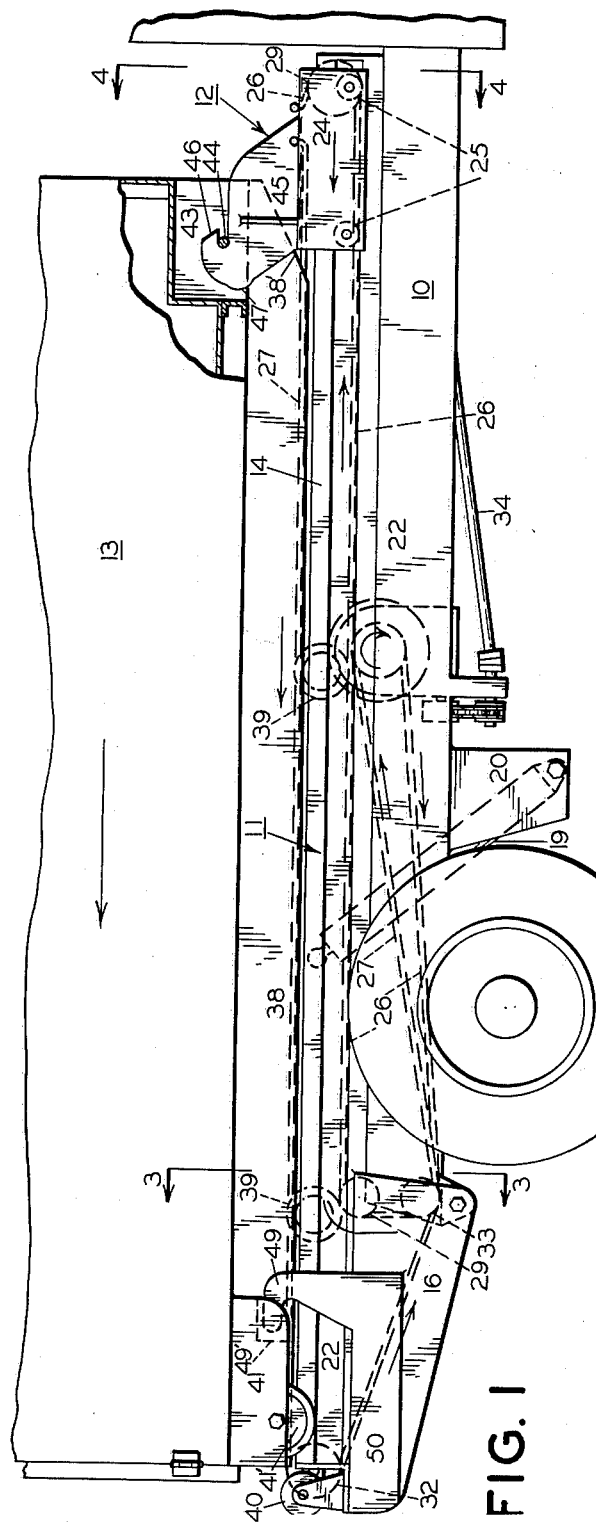
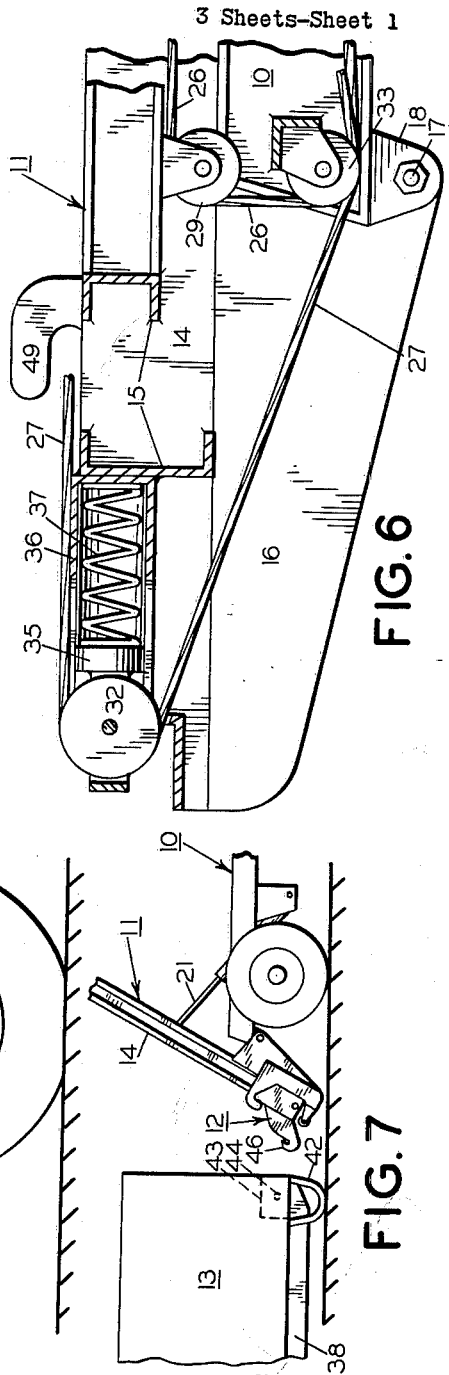
INVENTOR.
HAROLD G. ALEXANDER
BY
ATTORNEY

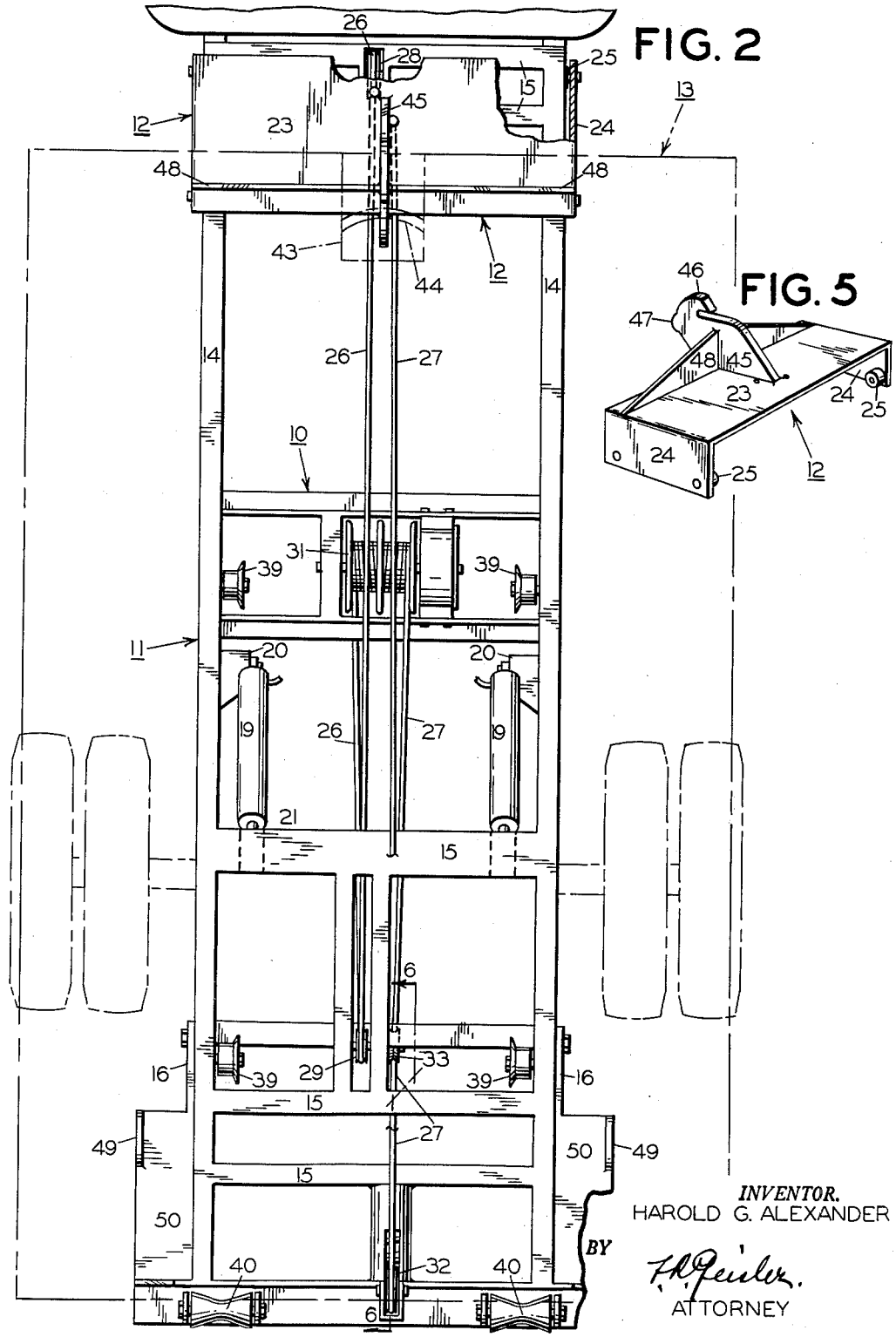

Feb. 12, 1963　　　　H. G. ALEXANDER　　　　3,077,278
TRUCK LOADING ASSEMBLY WITH DETACHABLE CONTAINER
Filed Dec. 16, 1960　　　　　　　　　　　　　3 Sheets-Sheet 3

INVENTOR.
HAROLD G. ALEXANDER
BY
ATTORNEY

United States Patent Office 3,077,278
Patented Feb. 12, 1963

3,077,278
TRUCK LOADING ASSEMBLY WITH
DETACHABLE CONTAINER
Harold G. Alexander, 2765 NE. 102nd Ave.,
Portland, Oreg.
Filed Dec. 16, 1960, Ser. No. 76,342
1 Claim. (Cl. 214—517)

This invention relates in general to load handling and hauling systems wherein the load to be handled is housed in or confined to a large container, with the container so constructed as to be capable of being loaded onto a truck for transportation by the truck, or unloaded from the truck at a desired destination, entirely through the medium of mechanism mounted on the truck.

More particularly, the present invention relates to a load-carrying vehicle or truck, having means for handling and transporting large, detachable and specially constructed, containers suitable for materials of various sorts.

An object of the invention is to provide an improved and simplified truck-loading assembly in combination with such a detachable container whereby the loading of the container onto the truck or the unloading of the container from the truck can be done entirely, quickly, easily and positively by simplified mechanical means carried by the truck.

A further and related object of the invention is to provide a truck for such an assembly with a tiltable container-supporting frame having a container-engaging carriage movable on the frame in either direction and operated by simple, positively-acting, mechanical means driven from the truck motor.

The manner in which these objects and other advantages are attained with the present invention, and the manner in which the container-loading and unloading means, including especially the container-engaging carriage on the truck, are constructed and operated, will be briefly explained and described with reference to the accompanying drawings.

In the drawings:

FIG. 1 is a fragmentary side elevation of that portion of the truck of the assembly on which the container is carried, showing the lower portion of the container, with the container in fully loaded position on the truck, a portion of the lower front end of the container being partly broken away for clarity;

FIG. 2 is a plan view of the tiltable container-supporting frame on the truck with the container-engaging carriage on the frame, the outline of the container in the fully loaded position of FIG. 1 being indicated in this figure by broken lines;

FIG. 5 is a perspective view of the container-engaging carriage, shown by itself and entirely removed from the truck;

FIG. 6 is a fragmentary section taken on the line indicated at 6—6 in FIG. 2, drawn to a larger scale;

Figure 8:
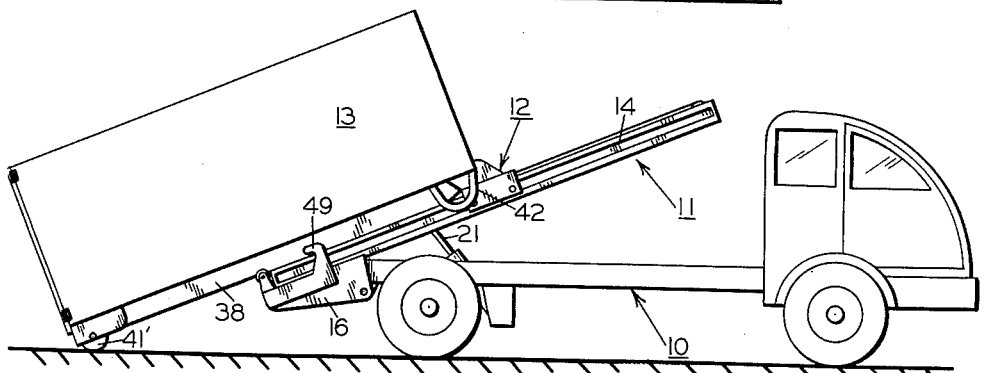

FIG. 7 is a fragmentary, more or less diagrammatic, elevation, drawn to a small scale, illustrating the relative position of the truck and of the tiltable frame on the truck, and of the carriage on the frame, preparatory to the engagement of the container by the carriage for the purpose of loading the container onto the truck; and FIG. 8 is a similar elevation illustrating the container in the process of being loaded onto, or unloaded from, the truck.

In the figures, referring first particularly to FIGS. 7 and 8, the body or chassis of the truck is indicated in general by the reference character 10, the tiltable frame on the truck is indicated in general by 11; movable carriage on the tiltable frame is indicated in general by 12; and the detachable container is indicated at 13.

The tiltable frame 11 (FIG. 2) includes two main parallel longitudinal or side members 14, integrally connected by a series of cross members 15. A pair of side plates 16, secured to the rear portion of the tiltable frame 11 (FIGS. 1, 3, 6 and 8) extend downwardly from the frame beyond the rear end of the truck body at opposite sides of the frame respectively. A pivot bolt 17 (FIGS. 3 and 6) connects each of these side plates 16 with an ear 18 extending downwardly from the rear of the truck body, and these pivot bolts provide the pivotal mounting for the tiltable frame on the truck body.

A pair of hydraulic cylinders 19 (FIGS. 1 and 2), pivotally mounted at the bottom ends on a pair of brackets 20 secured to opposite sides of the truck body, have pistons with piston rods 21 extending up beyond the cylinders and pivotally attached at their upper ends to one of the cross members 15 of the tiltable frame 11. Thus, as apparent, the tiltable frame 11 can be swung from the horizontal position of FIG. 1 to desired inclined positions, such as those illustrated in FIGS. 8 and 7, and returned to horizontal position by operation of the hydraulic cylinders and pistons, these being operated by suitable means (not shown) with the usual controls located on the truck.

Each of the two side members 14 of the tiltable frame 11 (FIGS. 3 and 4) is so formed as to provide the guideway 22 extending inwardly from the outer face of the side member and extending longitudinally the entire length of the side member. These guideways accommodate the rollers for the movable carriage 12, as presently explained, and provide the necessary confining tracks for the carriage. While these two side members 14 may be manufactured in various ways, I have found it convenient to make each side member from a channel iron, arranged with the channel open to the outer side, and having a pair of small angle irons welded in the channel and oppositely positioned at the top and bottom of the channel respectively, thus leaving an open space between the angle irons in the channel to provide the necessary guideway.

Figure 4:
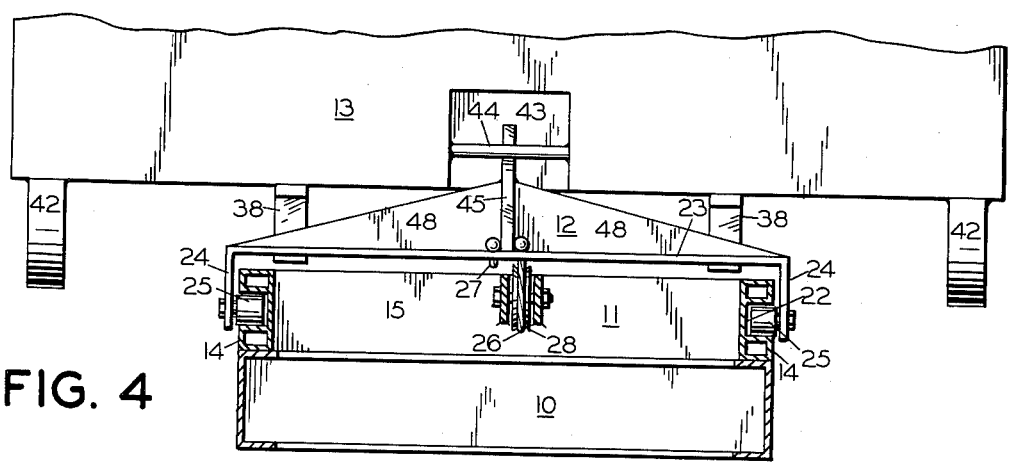
FIG. 4 is a similar sectional elevation on line 4—4 of FIG. 1.

The movable carriage 12 (FIGS. 1, 2, 4 and 5) includes a top plate or deck 23 with downwardly-extending flanges or side walls 24 at each side, the width of the top plate being such that these downwardly-extending flanges or side walls 24 will be spaced a slight distance outwardly from the outside faces of the respective composite main members 14 of the tiltable frame 11, as shown best in FIG. 4. A plurality of rollers 25 are carried by each of the side walls 24, being rotatably mounted on stub shafts secured in the side walls and extending inwardly. The diameter of these rollers 25 is slightly less than the height of the guideways 22 in the composite side members 14 of the pivotal frame, and consequently these rollers enable the carriage 12 to be moved along on the tiltable frame 11 and also prevent the carriage from being lifted upwardly from the frame.

A pair of cables 26 and 27 (FIGS. 1 and 2) each have an end anchored in the carriage 12 and extend in opposite directions from the carriage. Thus cable 26 extends forwardly from the carriage, passes around a pulley 28 (see also FIG. 4) centrally mounted at the front end of the tiltable frame 11, then extends rearwardly below the top of the frame 11, passes around a rear pulley 29 (FIGS. 3 and 6) on the frame located near the rear end of the body portion of the truck, then passes down around a lower pulley 30 (shown in part in FIG. 3) mounted on the body of the truck, and then extends forwardly to one portion of a double acting winch 31 on which the other end of this cable 26 is secured. The purpose of the cable 26, as apparent, is to move the carriage 12 forwardly on the frame 11 whenever the winch 31 is operated in one direction, while permitting the carriage to be moved rearwardly on the frame 11 when the winch is operated in the reverse direction.

The other cable 27 extends rearwardly from the carriage 12, passes around a pulley 32 (FIGS. 1, 2 and 6), located at the rear end of the tiltable frame 11, then passes under a pulley 33 located at the rear of the truck body, and then extends forwardly to another portion of the winch 31 on which this cable 27 is wound oppositely with respect to the corresponding end of the cable 26. The purpose of this cable 27 is to move the carriage 12 rearwardly on the frame 11 when the winch 31 is operated in one direction, permitting the carriage to be moved forwardly when the winch is operated in the other direction.

Both cables 26 and 27 are taut at all times. Consequently operation of the winch 31 in either direction results in positive movement of the carriage 12 in one direction or the other. The winch 31 is connected through the medium of suitable gear means (not shown) with a power take-off shaft 34 (FIG. 1) driven from the truck motor.

In order to keep both cables taut at all times the pulley 32 (FIG. 6) at the rear of the tiltable frame 11, around which the cable 27 passes, is mounted on a spring-loaded plunger 35 which is slidably supported in a guideway 36. A spring 37 in the guideway is held under compression in the guideway 36 between the plunger 35 and the inner end of the guideway, thus constantly exerting a force to move the plunger 35 and pulley 32 rearwardly and consequently acting to keep the cable 27 taut, and also indirectly maintaining the other cable 26 also taut.

The bottom of the container 13 is provided with a pair of parallel runners 38 (FIG. 1 and 3) extending substantially the entire length of the container and located at equal distances inwardly from the respective sides of the container. The spacing between these runners 38 is such that these runners will ride on a series of flanged wheels 39 (see FIG. 3) located on the inside of the side members 14 of the tiltable frame 11, which flanged wheels are rotatably mounted on inwardly-extending stub shafts supported by the side members 14. To aid in guiding the runners 38 into proper position and onto the flanged wheels 39 when the container 13 is being loaded onto the frame 11 a pair of concave rollers 40 (FIG. 2) are mounted at the rear of the frame 11. The front ends of the runners 38 preferably are beveled, as indicated at 38' in FIG. 1, to assist the runners in passing over the rollers 40.

A pair of box housings 41 (FIG. 3) are mounted on the bottom of the container 13 at the rear and are spaced outwardly from the runners 38 respectively. The shaft for a ground wheel 41' is secured near the end in each housing 41. These ground wheels 41' extend down below the housings 41 and support the rear end of the container 13 when the container rests on the ground and part of the time when the container is being loaded onto or unloaded from, the truck. The container is also provided with a pair of forward rest supports 42 (FIGS. 4 and 7) for supporting the front end of the container when the container is entirely separated from the truck.

The front end of the container 13 is provided with an inwardly-extending center cavity 43 (FIGS. 1 and 4) in the bottom and front wall, which cavity is so arranged as to receive the engaging means carried by the carriage 12 and presently described. An engageable bar 44 extends across this cavity and has its ends firmly secured in the side walls of the cavity.

The engaging means on the carriage 12 (FIGS. 1, 2 and 4) comprises a center longitudinal, upstanding rib 45, the top rear portion of which is formed into a forwardly-opening hook 46 so located as to be capable of engagement with the bar 44 in the cavity 43 in the front end of the container 13, as shown best in FIG. 1. The rear edge of this rib 45 has a rounded portion 47 extending rearwardly from the main part of the carriage 12 and adapted to engage the bottom of the container 13 in the rear wall of the cavity 43 when the carriage 12 is required to push the container off the truck onto a platform or when the rib 45 is moved into engaging position when the container is to be moved onto the truck. This upstanding rib 45 is braced on each side by a transverse web 48 welded to the deck of the carriage and extending from the rib to each side of the carriage.

The manner in which the container 13 is loaded onto the truck from an entirely detached position will now be briefly described with reference to FIGS. 7 and 8. The carriage 12 is moved to the extreme rear end of the tiltable frame 11 by operation of the winch, as previously explained, and the frame 11 is tilted upwardly sufficiently to cause the end of the hook 46 of the carriage to be at a lower level than the bar 44 in the container cavity 43. When the container is resting on the ground it will be necessary to tilt the frame 11 upwardly to a considerable angle with the horizontal (as shown in FIG. 7) in order to bring the end of the hook 46 low enough. With the frame 11 tilted and the carriage 12 and hook 46 close to the ground the truck is then backed towards the container 13 until the back of the hook reaches the rear wall of the container cavity 43. Then the tilting of the frame 11 is reduced so as to bring the rib 45 into contact with the bar 44, the carriage 12 being moved forwardly to cause the hook 46 to engage the bar 44 and subsequently move the container with the carriage. The tilting of the frame 11 is gradually reduced so as to be in line with the bottom of the container as the container is pulled off the ground onto the frame 11. Then the frame 11 is lowered to horizontal position on the truck and the container is moved to the final or fully loaded position illustrated in FIG. 1. The reverse procedure is followed in the unloading of the container from the truck, unless the container is to be unloaded onto a raised platform or freight car requiring little or no tilting of the frame 11. In the latter case the carriage 12 is operated alone for the purpose of pushing the container rearwardly off the frame and truck.

Figure 3:
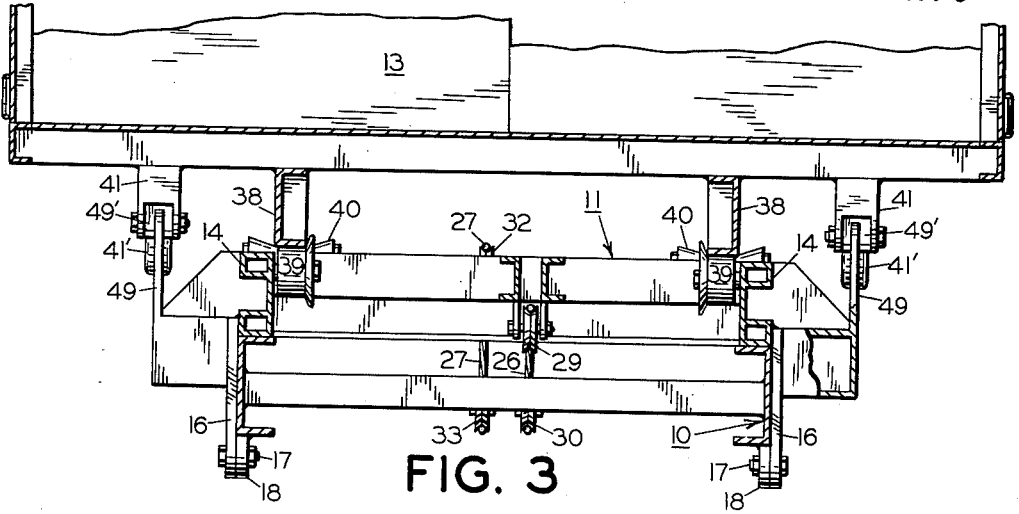
FIG. 3 is a sectional elevation on line 3—3 of FIG. 1, taken in the direction indicated by the arrows, and thus looking rearwardly.

In order to hold the rear end of the container 13 firmly down in place on the frame 11 when the container is loaded onto the frame and truck, the frame 11 is provided with a pair of rearwardly-extending hooks 49 (FIGS. 1, 2, 3 and 8). These hooks 49 extend upwardly from supporting brackets 50 which are secured on the outer faces of the rear side plates 16 of the frame 11 and are so located and positioned as to engage sockets 49' in the forward ends of the box housings 41 (FIGS. 1 and 3).

Thus when the container 13 is mounted on the truck in the fully loaded position, as illustrated in FIG. 1, the rear of the container 13 will be firmly held down on the frame 11 and kept from sliding forwardly on the frame 11 by engagement with the rear hooks 49; the forward end of the container will be held down on the frame 11, and also held from sliding rearwardly, by engagement with the hook 46 on the carriage 12; and the flanged wheels 39, engaging the runners 38 will hold the container against lateral shifting. All this is accomplished automatically as the container is moved forwardly by the carriage 12 into fully loaded position, no change of position of the container 13, when fully loaded on the frame 11 and truck, being possible until the carriage 12 moves rearwardly. No additional operation is required for locking the container in place on the truck against inadvertent moving or shifting. The fact that this is accomplished merely by a very simple carriage operated in a very simple manner by a very simple means is an important feature of the invention.

I claim:

In a truck and detachable container combination of the character described wherein the truck is provided with a tiltable container-carrying frame operable from the truck cab, the improved means for loading and unloading the container onto or from the container-carrying frame which comprises a carriage movable along said frame from one end of said frame to the other, cooperating rollers and guideways holding said carriage on said frame at all times, carriage-moving means consisting of cables and a double-acting winch for said cables operable from the truck cab for positively moving said carriage in either direction on said frame throughout the length of said frame, a central upstanding engaging rib element rigidly mounted on said carriage and extending in a vertical plane parallel to said guideways, said rib element formed with a forwardly-opening hook and rounded top and rear edge portion, the container provided with a center cavity at the bottom front end, the bottom and front of said cavity being open, said cavity having a rear wall engageable by said rear edge portion of said rib element when said rib element is moved sufficiently rearwardly in said cavity, an engageable cross bar for said rib element rigidly mounted in said cavity so arranged as to be positively and firmly engaged by said rib element when said carriage and rib element are moved into position beneath said cross bar and raised into normal position with respect to said container, whereby when said container is to be loaded onto said frame said carriage and rib element can be moved into position beneath said cavity and cross bar by the maneuvering of said frame and said truck while said carriage is at the rear end of said frame, whereupon the raising of the rear end of said frame and the bringing of said container into parallelism with said frame will produce positive engagement between said rib element and said cross bar with the forward movement of said carriage to mount said container on said frame, and whereby the rearward movement of said carriage when said container is on said frame will cause said rib element to engage said rear wall of said cavity to move said container rearwardly with respect to said frame.

References Cited in the file of this patent

UNITED STATES PATENTS

| | | |
|---|---|---|
| 2,348,019 | Norbom | May 2, 1944 |
| 2,580,501 | Anderson | Jan. 1, 1952 |
| 2,591,153 | Hodges | Apr. 1, 1952 |
| 2,786,590 | Edwards | Mar. 26, 1957 |
| 2,867,339 | Nelson | Jan. 6, 1959 |

FOREIGN PATENTS

| | | |
|---|---|---|
| 849,376 | Germany | Sept. 15, 1952 |

OTHER REFERENCES

Circular by Dempster Brothers, Inc., Folder No. 6590, copyright 1959, six pages.